(12) United States Patent
Kaeriyama

(10) Patent No.: US 8,610,997 B2
(45) Date of Patent: Dec. 17, 2013

(54) MICRO-ELECTROMECHANICAL DEVICE

(76) Inventor: Toshiyuki Kaeriyama, Tsukubamirai (JP)

( * ) Notice: Subject to any disclaimer, the term of this patent is extended or adjusted under 35 U.S.C. 154(b) by 10 days.

(21) Appl. No.: 13/279,259

(22) Filed: Oct. 22, 2011

(65) Prior Publication Data

US 2012/0069422 A1    Mar. 22, 2012

(51) Int. Cl.
  *G02B 26/00* (2006.01)
  *G02B 26/12* (2006.01)
(52) U.S. Cl.
  USPC ........ 359/291; 359/290; 359/295; 359/224.1; 438/50; 438/52; 345/690
(58) Field of Classification Search
  USPC ........ 359/290–295, 298, 224.1, 224.2, 223.1, 359/212.1, 212.2, 213.1, 230, 233, 237; 438/50, 52, 65, 66; 257/418; 345/690; 428/117
  See application file for complete search history.

(56) References Cited

U.S. PATENT DOCUMENTS

| | | | | |
|---|---|---|---|---|
| 5,661,591 A * | 8/1997 | Lin et al. | ........................ | 359/290 |
| 5,867,202 A | 2/1999 | Knipe | | |
| 6,952,304 B2 * | 10/2005 | Mushika et al. | ............... | 359/295 |
| 6,995,897 B2 * | 2/2006 | Mushika et al. | ............... | 359/300 |
| 7,046,422 B2 * | 5/2006 | Kimura et al. | ................ | 359/295 |
| 7,348,870 B2 * | 3/2008 | Hsu et al. | ......................... | 335/78 |
| 7,541,214 B2 * | 6/2009 | Wan | .................................. | 438/50 |
| 7,657,995 B2 * | 2/2010 | Hsu et al. | ......................... | 29/622 |
| 7,692,841 B2 | 4/2010 | Kaeriyama | | |

OTHER PUBLICATIONS

Larry J. Hornbeck, William E. Nelson, Bistable Deformable Mirror Device, Tech. Digest Ser.Osa, 1988, p. 107-110, vol. 8.

\* cited by examiner

*Primary Examiner* — Loha Ben

(57) ABSTRACT

As for the method that modulates optical path length by the position of reflection plane of light, the movement of the position-movable plate in micrometer-size electromechanical device can be restricted by the stopping plates placed above and below the edge of the position-movable plate, the distance between the stopping plates may be set depending on the desired amount in modulating the optical path length. The voltage differential in the device is operable to create electrostatic attraction, to perform transition movement of the position-movable plate between the stopping plates, the light reflector connected to the position-movable plate takes at least two states in positioning, enabling to modulate the optical path length of reflected light by the light reflector with high reproducibility and high accuracy.

16 Claims, 16 Drawing Sheets

MICRO-ELECTROMECHANICAL DEVICE

This application claims priority under 35 USC §119 of Japanese application number 2009-110476 filed Apr. 30, 2009. The entire disclosure of the Japanese application is hereby incorporated by reference into the present application.

FIELD OF THE INVENTION

This invention pertains to a type of micro-electromechanical device, and more particularly to spatial light modulators (SLMs) that modulate optical path length at high speed in high resolution.

BACKGROUND OF THE INVENTION

Conventional optical disks, such as CD and DVD, adopt the column data system which ties 1-bit information to a line and records it on a plane surface by a piece of laser pulse, and blue laser light DVD provides a storage capacity of several gigabytes per disk. On the other hand, holographic data recording system records thousands of bits page information in volume by a piece of laser pulse, and research progresses to the objective to attain several terabytes per disk. Electronic holography system calculates hologram interference fringe formed by the interference of coherent light, images the interference fringe pattern on a display device by the electronic control, and displays natural three-dimensional image by the display device. Along with the development of the display device that can build more high-definition system, the research and development of three-dimensional moving picture utilizing holography technology progresses, however, very big space-bandwidth product is required to the device for imaging fine interference fringe pattern of hologram.

Hologram is divided into an amplitude modulation type and a phase modulation type, the transmittance and diffraction efficiency of the phase modulation type hologram are higher than those of the amplitude modulation type hologram. Spatial light modulators that modulate optical phase, switches the frame of millions of pixels 10,000 times or more per second, may be useful for applications, such as the hologram data storage that modulates digital information into optical phase plane, records and reproduces the information by the optical hologram.

In the method modulating optical phase by controlling the position of light reflection surface, a micro-electromechanical device of micron-size structure has ability to set the position of light reflection surface with the accuracy sufficiently shorter than a wavelength of light. However, in driving micro-electromechanical device, it may be difficult to assure a reproducibility of the accuracy by some factors, such as the drive method like an analog drive, process variation at the time of manufacture, change on physical property of structural material by temperature, and metal fatigue by long-term-reliability operation.

The objectives of this invention are to provide a type of the micro-electromechanical device that modulates an optical phase by the control of the position of light reflection surface with high accuracy, at high speed, and in high resolution.

SUMMARY OF THE INVENTION

Limiting the movement of a movable structure in a micro-electromechanical device to the range sandwiched by two cantilever stopping plates, driving electromechanically the movable structure to perform the transition movement from one side of the range to another side of the range and vice-versa, and to stop, settle, and stabilize on either side of the range. Thus, the micro-electromechanical device of this invention is operable with the two stable states that the movable structure of the micro-electromechanical device can take.

A light reflector is formed and united in the movable structure, the optical path length of the light reflected on the surface of the light reflector is set accurately by the fixed distance between the cantilever stopping plates, enabling good reproducibility in modulating optical path length, that is, it is an optical phase. Further, the tolerance of positioning of the light reflector in the state of stabilization can be adjusted slightly as required.

The weight of the movable structure may be several micrograms, it may take several microseconds for the movable structure to performs the transition movement to one position from the position of another side. Many movable structures are arranged and an array is constituted, it can be possible to modulate the optical path length of the two dimensional plane of light at high speed in high resolution.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention and for further advantages thereof, reference is now made to the following detailed description taken in conjunction with the accompanying drawings in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
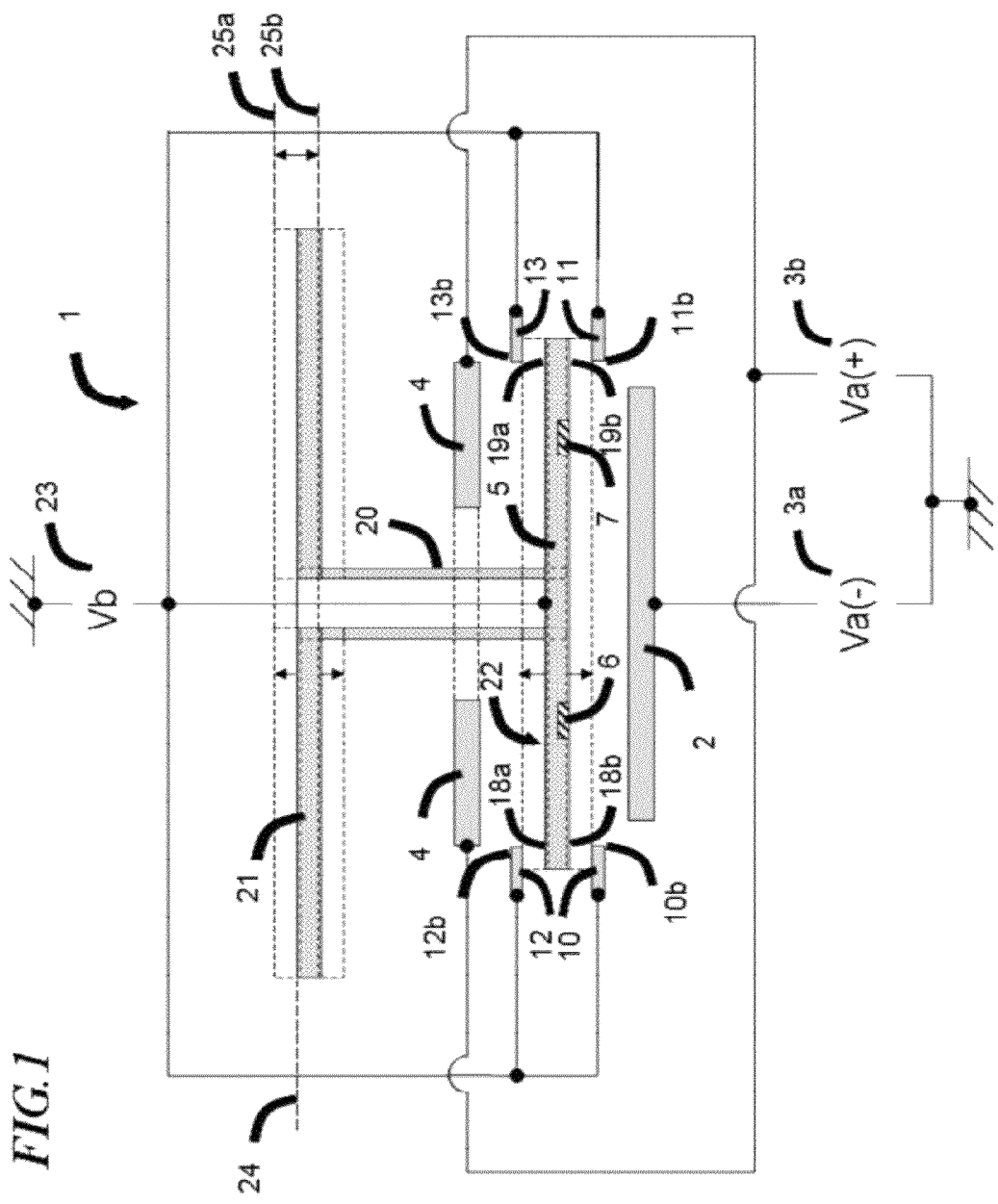
FIG. 1 illustrates a high-level side view of the micro-electromechanical device of the invention.

FIG. 1 illustrates a high-level side view of a structure of the micro-electromechanical device 1 of the invention with support circuitry. The micro-electromechanical device 1 comprises the spatial configuration formed at a monolithic from multi-layer thin film metal with conductivity on a substrate which may be CMOS silicon substrate in which may contain a memory cell circuitry and a bias circuitry.

Forming the thin film metal electrode plate 2 that constitutes the bottom layer of micron-size superstructure on a silicon substrate, and an address complementary output voltage Va(−) 3a from a memory cell is connected to the electrode plate 2 and forming the thin film metal electrode plate 4 in space above the plate 2 with aligning to the plate 2, and an address complementary output voltage Va(+) 3b from a memory cell is connected to the plate 4. Aligning the thin film metal electrode plate 5 to the plates 2 and 4, the plate 5 is suspended horizontally in a space between the plates 2 and the plate 4 by thin film metal hinges 6 and 7 that connect the plate 5 and the support pillars that are currently omitted in FIG. 1. A shape of the hinges 6 and 7 are designed to allow bending elastically up and down.

The thin film metal cantilever stopping plates 10, 11, 12 and 13 are arranged around the plate 5 with slightly overlapping to an edge of the plate 5, above and below the plate 5. The plates 10 and 11 are placed in the space at the height position between the plates 2 and 5. And the cantilever stopping plates 12 and 13 are placed in a space at the height position between the plates 4 and 5. The free end 10b of the plate 10 overlaps to the bottom surface 18b of the edge of the plate 5 below the edge of the plate 5 and the free end 11b of the plate 11 overlaps to the bottom surface 19b of the edge of the plate 5, below the edge of the plate 5. And the free end 12b of the plate 12 overlaps to the upper surface 18a of the edge of the plate 5 above the edge of the plate 5 and the free end 13b of the plate 13 overlaps to the top surface 19a of the edge of the plate 5 above the edge of the plate 5 as well.

The support pillar 20 is built on the center part of the plate 5, and the pillar 20 supports the thin film metal electrode plate and light reflector 21. The plate 5, the pillar 20, and the plate and light reflector 21 are unified and configure a movable structure 22. As an aperture is formed in the center part of the plate 4, the pillar 20 passes through the plate 4 without touching to any edge of the aperture of the plate 4. A common bias voltage Vb 23 is applied to the structure 22 and the plates 10, 11, 12, and 13. A potential difference is then created among the structure 22, the plate 2 and the plate 4, and an electrostatic attraction is generated among them. The height of the pillar 20 may be set up in order that the electrostatic attraction working between the plate 4 and the plate and light reflector 21 becomes smaller than that working between the plate 4 and the plate 5.

In the state that the voltage Va(−) 3a and the voltage Va(+) 3b are impressed, when the voltage Vb 23 is set to a low voltage value and applied, in consequence that the synthesized force of the electrostatic attraction acting between the plate 5 and the plate 2 and the electrostatic attraction acting between the plate 4 and the structure 22 works to the structure 22, the hinges 6 and 7 suspending the plate 5 in the structure 22 bend upwards or downward with generating restoring force and the structure 22 moves up or down with maintaining the level, then the structure 22 stands still at the position where the restoring force generated by the bending of the hinges 6 and 7 balances with the synthesized force. Increasing further the voltage Vb 23 where the voltage Va(−) 3a and the voltage Va(+) 3b are impressed, the synthesized force is increased more, in the consequence that the structure 22 moves up or down further, the amount of bending of the hinges 6 and 7 are gradually increased, and eventually either the upper surface 18a and 19a of the edge of the plate 5 touch to the free ends 12b and 13b of the plates 12 and 13, or the undersurface 18b and 19b of the edge of the plate 5 touch to the free ends 10b and 11b of the plates 10 and 11, the plate 5 is stopped by the free ends of the cantilever stopping plates, the synthesized force is transmitted and divided from the plate 5 to the hinges 6 and 7, and either the plates 10 and 11 or the plates 12 and 13, and the hinges 6 and 7 and either the plates 10 and 11 or the plates 12 and 13 may bend slightly respectively. The movement of the plate 5 is stopped when the synthesized force comes to balance with the restoring force of the hinges and the stopping plates. The surface 24 of the plate and light reflector 21 in the structure 22 moves together with linking to the movement of the plate 5 and is stopped at either a position 25a or 25b. The distance between the positions 25a and 25b is correlated with the amount of optical path length difference of a light irradiated to the surface 24 and reflected on the surface 24. It is also noted that the amount of slight position change caused by the bending of a thin film metal cantilever stopping plate, may be contained in the distance.

Figure 2:
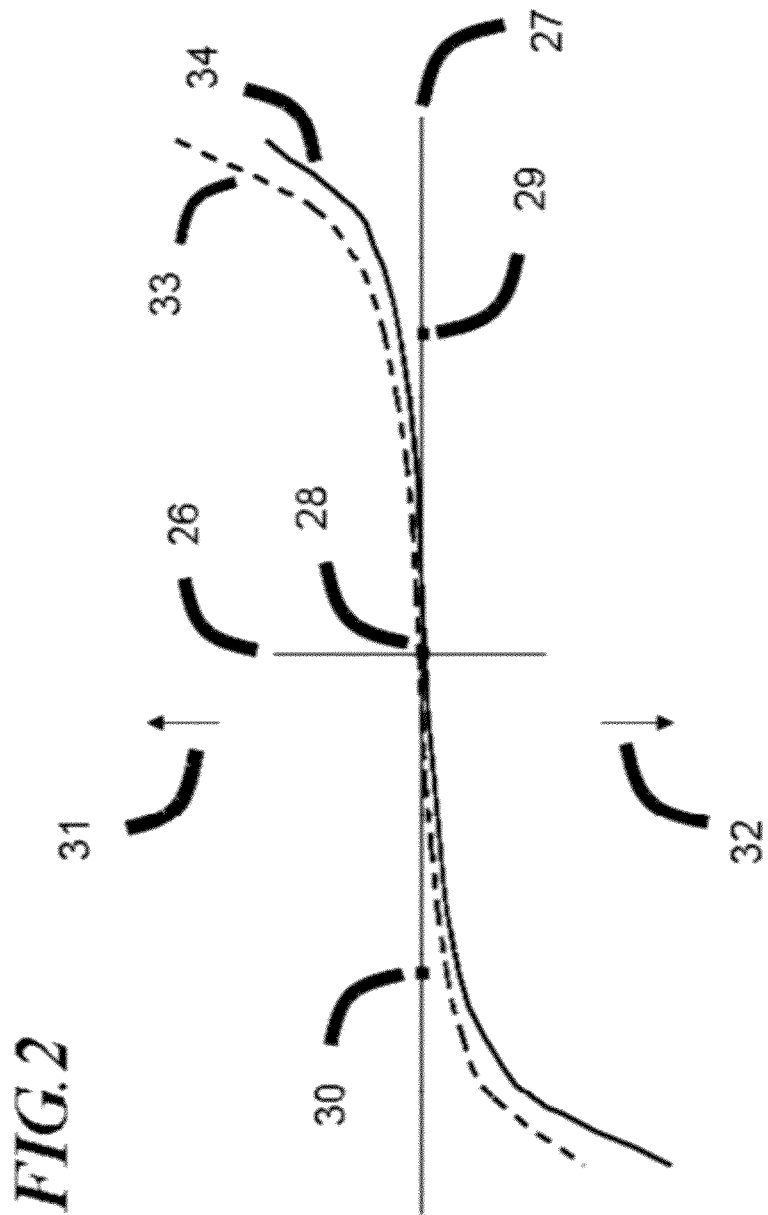
FIG. 2 illustrates a general dependency of an electrostatic attraction that works to the movable structure in the micro-electromechanical device of the invention on positions in height.

FIG. 2 illustrates an example of the relation of the electrostatic attraction working to the plate 5 of the structure 22 at the height position where the plate 5 of the structure 22 locates. The axis 26 represents the electrostatic attraction acting to the structure 22, and the axis 27 represents the height position where the plate 5 of the structure 22 locates. The plate 5 of the structure 22 is situated in the middle of the height position between the plate 2 and the plate 4. In case of setting the space interval between the plate 2 and the plate 5 and between the plate 5 and the plate 4 to about 1 μm respectively, and the area of the plate 2 and the plate 4 to about 80 square μm respectively, the voltage Vb 23 applied to the structure 22 to about 25 V, the voltage Va(−) 3a to the plate 2 to about 5 V or 0 V, and the voltage Va(+) 3b to the plate 4 to 0 V or about 5 V. The curve 33 expresses the case where the voltage Va(−) 3a is 5 V and the voltage Va(+) 3b is 0 V. When the plate 5 locates at the position 28 corresponding to the middle of the height between the plate 10 or 11 and the plate 12 or 13, the electrostatic attraction of the direction 31 that the structure 22 is pulled to the plate 4 is about 25 nN. As the plate 5 of the structure 22 moves from the position 28, the electrostatic attraction working to the structure 22 increases non-linearly. Moving upwards to the position 29 corresponding to the height of the plate 12 or 13 by, for example, 0.5 μm from the position 28, the electrostatic attraction of the direction 31 increases to 1300 nN. And moving down to the position 30 corresponding to the height of the plate 10 or 11 by, for example, 0.5 μm from the position 28, the electrostatic attraction of the direction 32 that the structure 22 is pulled to the plate 2 comes to 910 nN. Meanwhile, the curve 34 expresses the case where the voltage Va(−) 3a is 0 V and the voltage Va(+) 3b is 5 V. When the plate 5 locates at the position 28, the electrostatic attraction of the direction 32 that the structure 22 is pulled to the plate 2 is about 25 nN. As the plate 5 of the structure 22 moves from the position 28, the electrostatic attraction working to the structure 22 increases non-linearly. Moving up to the position 29, the electrostatic attraction of the direction 31 comes to 780 nN, on the other hand, moving down to the position 30, the electrostatic attraction of the direction 32 comes to 1400 nN. Consequently, from the curve 33 and 34 in that the data of the voltage Va(−) 3a and the voltage Va(+) 3b are flipped, when the plate 5 of the structure 22 locates either at the position 29 or 30, it is seen that the electrostatic attraction working to the structure 22 is reduced by about 40% respectively by flipping data in a memory cell.

When the plate 5 of the structure 22 is in the state of stopping at the height position of either the plates 12 and 13 or the plates 10 and 11 under a supply of the voltage Vb 23 to the structure 22, the voltage Va(−) 3a to the plate 2, and the voltage Va(+) 3b to the plate 4 respectively, the hinges 6 and 7 that suspend the plate 5 horizontally are designed in order that the plate 5 is maintained to stand still at the height position against the restoring force from the bent hinges 6 and 7 even with the state that the stress impressed from the plate 5 to either the plates 12 and 13 or the plates 10 and 11 is decreased by flipping the data in a memory cell. When the voltage Vb 23 and the voltages Va(−) 3a and Va(+) 3b from a memory cell are removed, electrostatic attraction does not be generated, consequently the hinges 6 and 7 suspending the plate 5 of the structure 22 do not bend, and the plate 5 stands still horizontally at the middle of the height position between the plate 2 and the plate 4. As the bias voltage Vb 23 is come back and increased, due to the action of generated electrostatic attraction, energy state at the height position of both the plates 12 and 13 and the plates 10 and 11 moves to the stable state with gaining lower energy potential, moreover, even in the state that the data in a memory cell are flipped, the plate 5 is held at the height position of either the plates 12 and 13 or the plates 10 and 11 and it comes to be able to hold the plate 5 electromechanically at the height position. That is, with applying 25 V of the voltage Vb 23 to the plate 5, 5 V of the voltage Va(−) 3a to the plate 2, and 0 V of the voltage Va(+) 3b to the plate 4, respectively, the plate 5 is held still at the height position of the plates 12 and 13, even when the data in memory cell is flipped to 0 V for the voltage Va(−) 3a and to 5 V for the voltage Va(+) 3b.

With applying 0 V of the voltage Va(−) 3a to the plate 2 and 5 V of the voltage Va(+) 3b to the plate 4, and 25 V of the voltage Vb 23 to the structure 22, and the plate 5 of the structure 22 is in latched state at the height position of the plates 12 and 13, when the reset voltage pulse containing the frequency component of mechanical resonant vibration of the structure 22 is superimposed to the voltage Vb 23, the structure 22 is excited with the frequency of its mechanical resonant vibration, and then the bias voltage Vb 23 is immediately decreased to 5 V which is equivalent with the value of the voltage Va(+) 3b and the electrostatic attraction working between the structure 22 and the plate 4 is removed, and the state of a bias voltage off is set up. With the help of the restoring force by bending of the hinges 6 and 7 and the plates 12 and 13, and the moving force by vibration at the mechanical resonant frequency of the structure 22 excited by the reset pulse, the plates 5 of the structure 22 takes off from the plates 12 and 13 and enters into the movement process toward the position 28 corresponding to the middle of the height position between the plates 10 and 12 with receiving the acceleration of the electrostatic attraction of several nN working near the height position of the plates 12 and 13 with the direction 32 that the plates 5 is drawn to the plate 2 due to 5 V of the potential difference between the plates 5 and the plate 2.

The surface of the thin film metal may be coated with low-contact-force layer and the contact force between the plate 5 of the structure 22 and the plates 12 and 13 is controlled to low level. However, intermolecular contact force still exists. Impressing the reset voltage pulse containing the frequency component of the mechanical resonant vibration of the structure 22 to the structure 22, and inducing the vibration motion force by the mechanical resonant vibration in the structure 22 make the plate 5 take off from the plates 12 and 13 reliably.

On the other hand, in case that the data in a memory cell are kept same even after the data are rewritten, at the state of the bias voltage off while 5 V of the voltage Vb 23 is impressed to the plate 5, and 0 V of the voltage Va(+) 3b is impressed to the plate 4, when the plate 5 takes off from the plates 12 and 13, with the help from the restoring force by the bending of the hinges 6 and 7 and the plates 12 and 13, and the movement force by vibration at the mechanical resonant frequency of the structure 22 excited by the reset voltage pulse containing the frequency component of the mechanical resonant vibration of the structure 22, and with receiving the braking of electrostatic attraction of about 30 nN generated by 5 V potential difference between the plate 5 and the plates 4 to the direction that the plate 5 is pulled to the plate 4, near the height position where the plates 12 and 13 locate, it goes into the movement process of taking off from the plates 12 and 13, and then returning to the position 28 corresponding to the middle of the height position between the plates 10 and 12.

Meanwhile, with applying 5 V of the voltage Va(−) 3a to the plate 2, 0 V of the voltage Va(+) 3b to the plate 4, and 25 V of the voltage Vb 23 to the structure 22, when the plate 5 of the structure 22 is electromechanically latched at the height position of the plates 10 and 11, superimposing the reset voltage pulse containing the frequency component of the mechanical resonant vibration of the structure 22 onto the voltage Vb 23 and exciting the structure 22 by the reset voltage pulse, and then, setting the voltage Vb 23 down to 5 V which is equivalent to the voltage Va(−) 3a, and setting the state to the bias voltage off, and removing the electrostatic attraction that works between the structure 22 and the plate 2, with the help from the restoring force released from the bent hinges 6 and 7 and the bent plates 10 and 11 and the movement force by vibration at the mechanical resonant frequency of the structure 22 excited by the reset voltage pulse, the structure 22 moves to the process of taking off from the plates 10 and 11 and returning to the position 28 that is equivalent to the middle of the height position between the plates 10 and 12, in order to maintain the electrostatic attraction of several nN near the height position where the plates 10 and 11 locate to the direction 31 that the structure 22 is pulled to the plate 4, the height of the pillar 20 connecting the plate 5 and the plate and light reflector 21 is designed to meet that the electrostatic attraction working between the plate 4 and the plate and light reflector 21 may be, for instance, about 50% of that working between the plate 4 and the plate 5.

Therefore, the plate 5 of the structure 22 is in latched state at the height position of either the plates 12 and 13 or the 10 and 11, and the relation of the potential difference among the plate 2 supplied by the voltage Va(−) 3a from a memory cell and the plate 4 supplied by the voltage Va(+) 3b from a memory cell, and the structure 22 in the state of the bias voltage off in which the bias voltage may be set to, for example, 5 V that is equivalent to an address complementary output voltage, is determined by the data of a memory cell, a difference arises in the motion velocity which the plate 5 of the structure 22 starts returning to the position 28 corresponding to the middle of the height position between the plates 10 and 12, and its state is differentiated consequently in several microseconds in the state of the bias voltage off, and then, the bias voltage is put back to the original value of 25 V, it enters into the motion process if the plate 5 at the position 29 will move either to the position 30 where the plates 10 and 11 locate or be pulled back to and stay on the position 29 where the plates 12 and 13 locate, or the motion process if the plate 5 at the position 30 will move either to the position 29 or be pulled back to and stay on the position 30, and the plate 5 of the structure 22 reaches new holding position of either the position 29 or 30, and lands on either the plates 12 and 13 or the plates 10 and 11, while the transient response of mechanical vibration caused by the shock at landing of the plate 5 declines, it may be required for several microseconds, and the movement process is finally completed.

In the differentiation and the movement process of the plate 5 of the structure 22 for either the position movement or the position stay, address complementary output voltage may be raised temporarily to, for example, 8 V from 3 V or 5 V of its normal value. It may help improve the characteristic of the process for both the position movement and the position stay. When the transient response of the mechanical vibration generated by the shock at the landing of the plate 5 on the thin film metal cantilever stopping plates is declined and stabilized well, it may be safe to start following data write-in cycle for a memory cell, as such a malfunction that the position of the plate 5 is changed during the write-in cycle may not happen. Meanwhile, under the biased condition as 24 V of the voltage Vb 23, a stress is transmitted from the plate 5 to the free ends 10b, 11b, 12b, and 13b of the plates 10, 11, 12, and 13, therefore, the plates 10, 11, 12, and 13 are slightly bent, and the height position where the plate 5 stands still may change slightly in conjunction with the bending. The bias voltage suited for the position movement or the position stay for the structure 22 may not match normally with the bias voltage fitting for obtaining desired optical path length of the light reflected on the surface 24 of the plate and light reflector 21. After that the transient response of the mechanical vibration by the shock at landing of the plate 5 of the structure 22 is declined and stabilized, the bias voltage may be adjusted to the value that corrects the optical path length.

Figure 3:
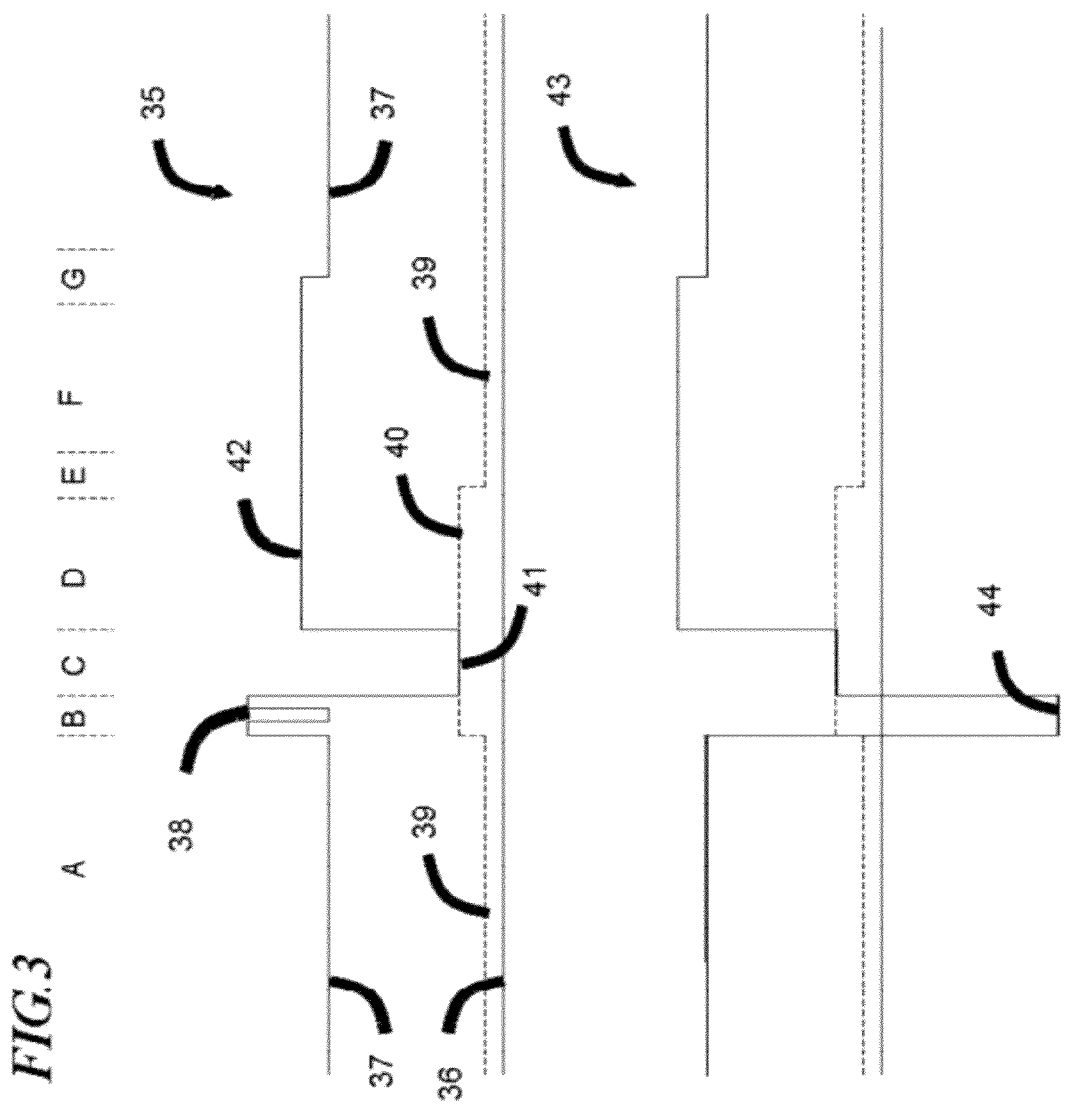
FIG. 3 illustrates a basic sequence to drive the micromechanical device of the invention.

FIG. 3 illustrates an example of a basic sequence to drive the micro-electromechanical device 1 of this invention. A basic sequence may be consisted of following 7 steps; A: Data write to memory cell, B: Optical path length correction bias voltage reset/address complementary output voltage High, C: Optical path length correction bias voltage off/differentiation to either position movement or position stay, D: Drive bias voltage application/motion of position movement or position stay, E: Address complementary output voltage high off, F: Transient response stabilization of mechanical vibration due to landing shock, and G: Optical path length correction bias voltage re-application. The basic sequence 35 to drive the micro-electromechanical device 1 is described hereinafter. After data are written to a memory cell in the state that bias voltage is set to the optical path length correction voltage 37 to the grand level 36, superimposing the resonance pulse 38 to the bias voltage 37 and providing mechanical resonant vibration energy to the structure 22, at the same time, raising the normal address complementary output voltage 39 to the address complementary output voltage 40 in high state, and decreasing the bias voltage 37 to the bias voltage 41 that value is equivalent to that of the voltage 40, and the state of the bias voltage off is set up. Then, in a microsecond, the drive bias voltage 42 is impressed back and the voltage 40 in high state is pulled back to the voltage 39, and passing through the transient response stabilization for the mechanical resonant vibration caused by landing shock, the voltage 42 is corrected to the voltage 37. The basic application sequence 43 to drive the micro-electromechanical device 1 is fundamentally the same as the sequence 35 except that larger mechanical resonant vibration energy can be provided to the structure 22 by using the bipolar reset pulse 44 which is formed by reversing the polar character of bias voltage. The weight of the structure 22 that the plate and light reflector 21 and the plate 5 are connected by the pillar 20, may be several micrograms and the structure 22 is driven at the speed of several tens of centimeters per second by electrostatic attraction. When the distance from the position 29 corresponding to the height position of the plates 12 and 13 to the position 30 corresponding to the height position of the plates 10 and 11, may be designed to, for example, about 1 um, and it would take several microseconds for the plate 5 of the structure 22 to move from the position 29 to the position 30 or vice versa.

Figure 4:
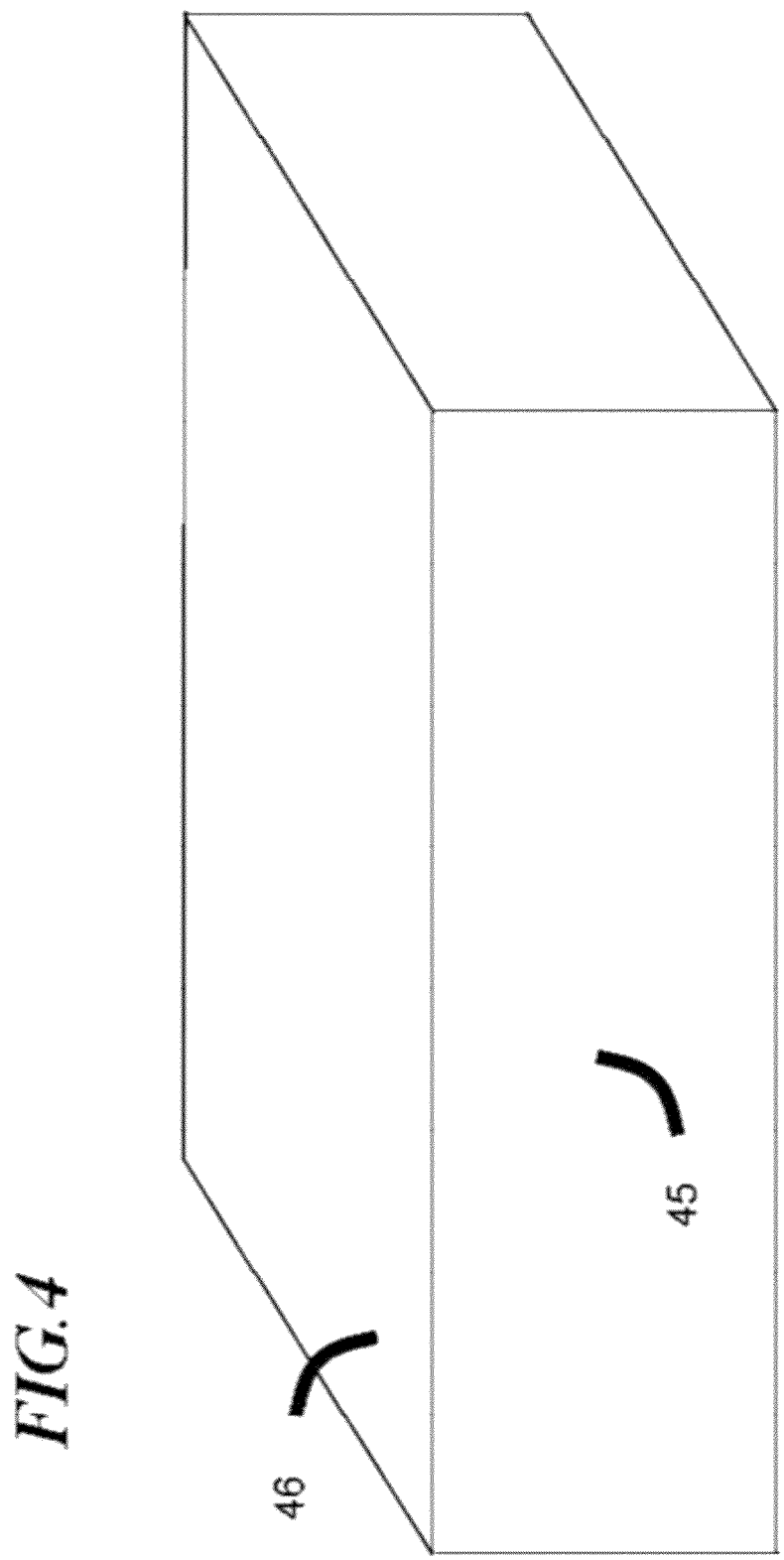
FIGS. 4-14 illustrate the steps to process and build the micro-electromechanical device of the invention.
Figure 5:
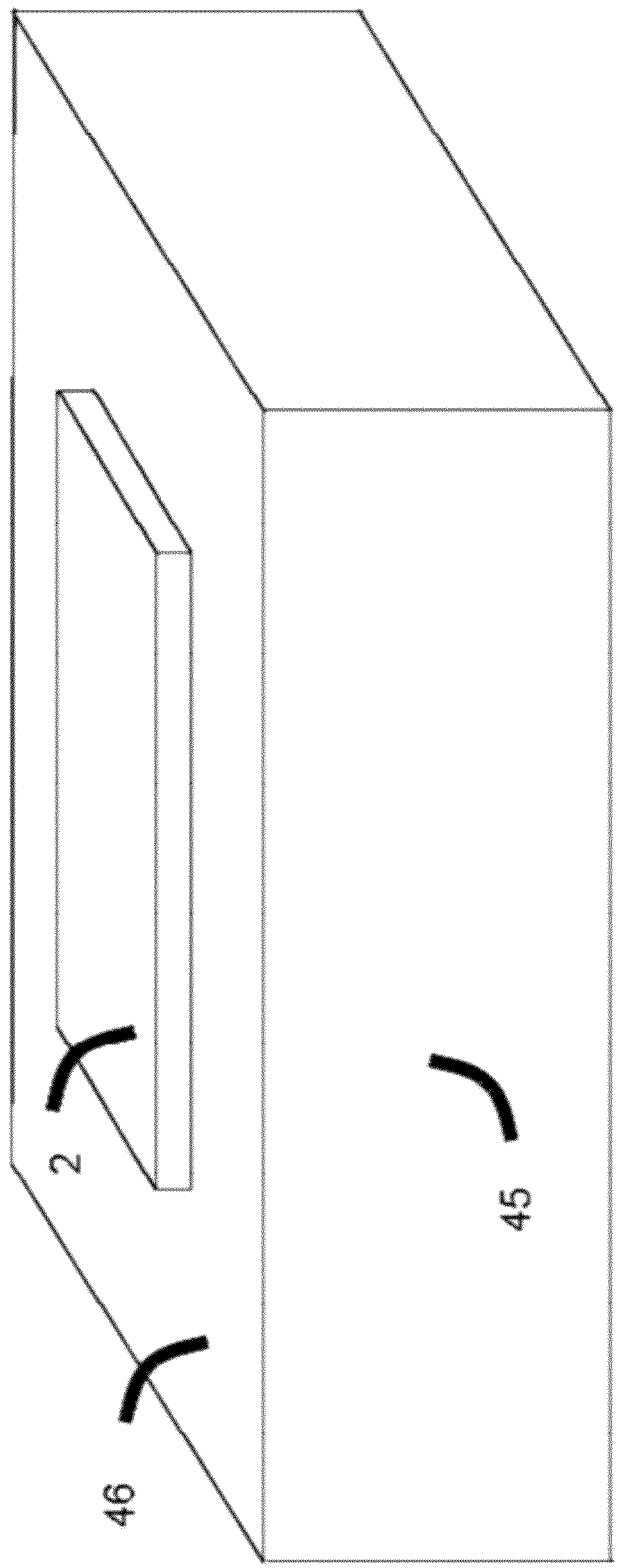
Figure 6:
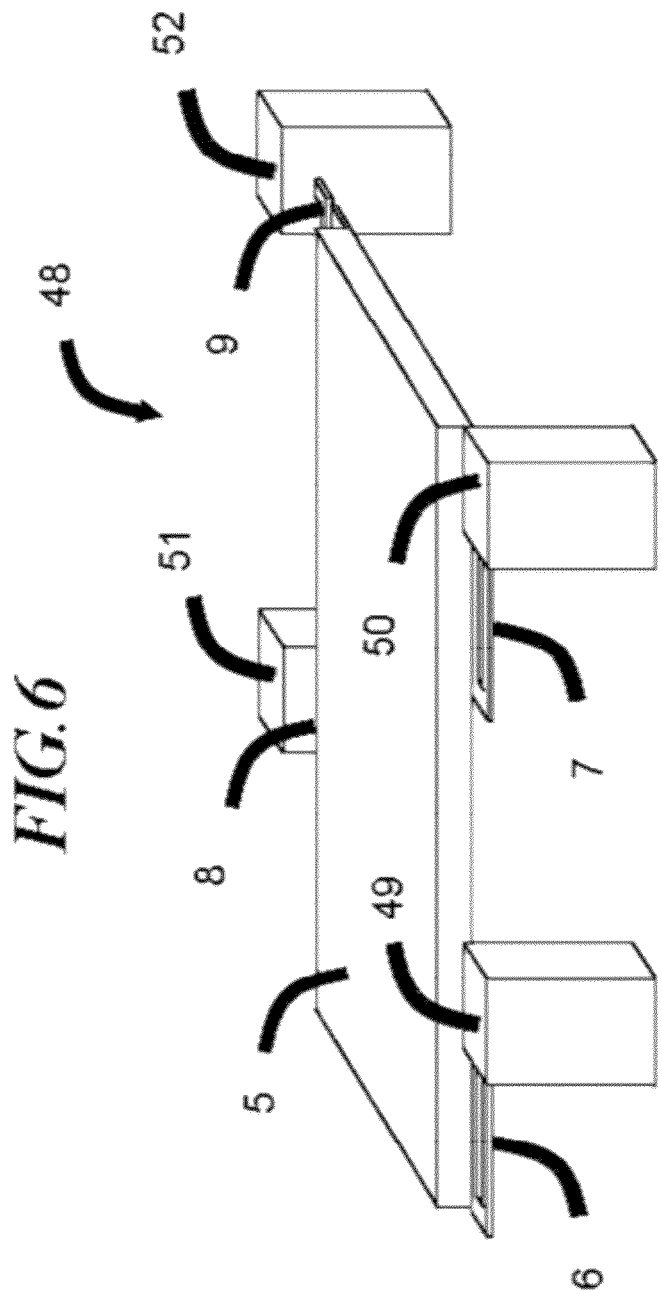
Figure 7:
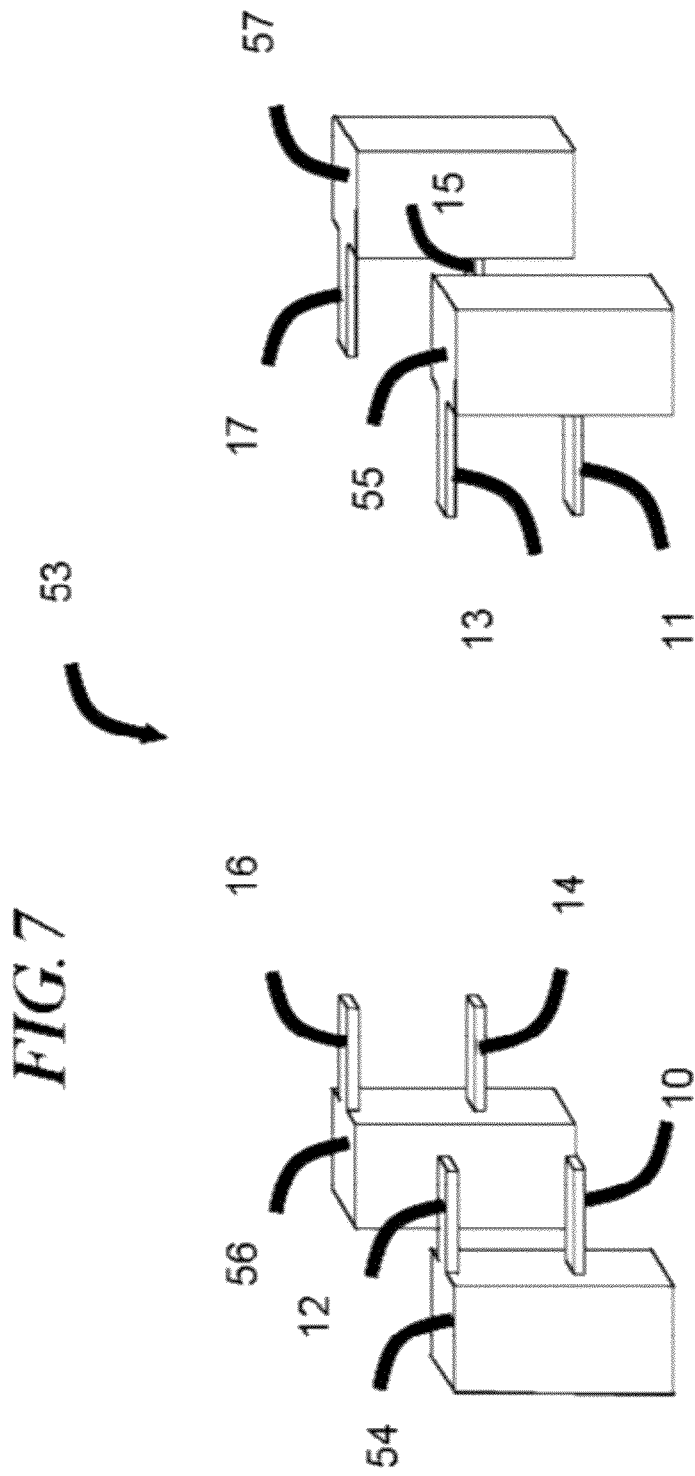
Figure 8:
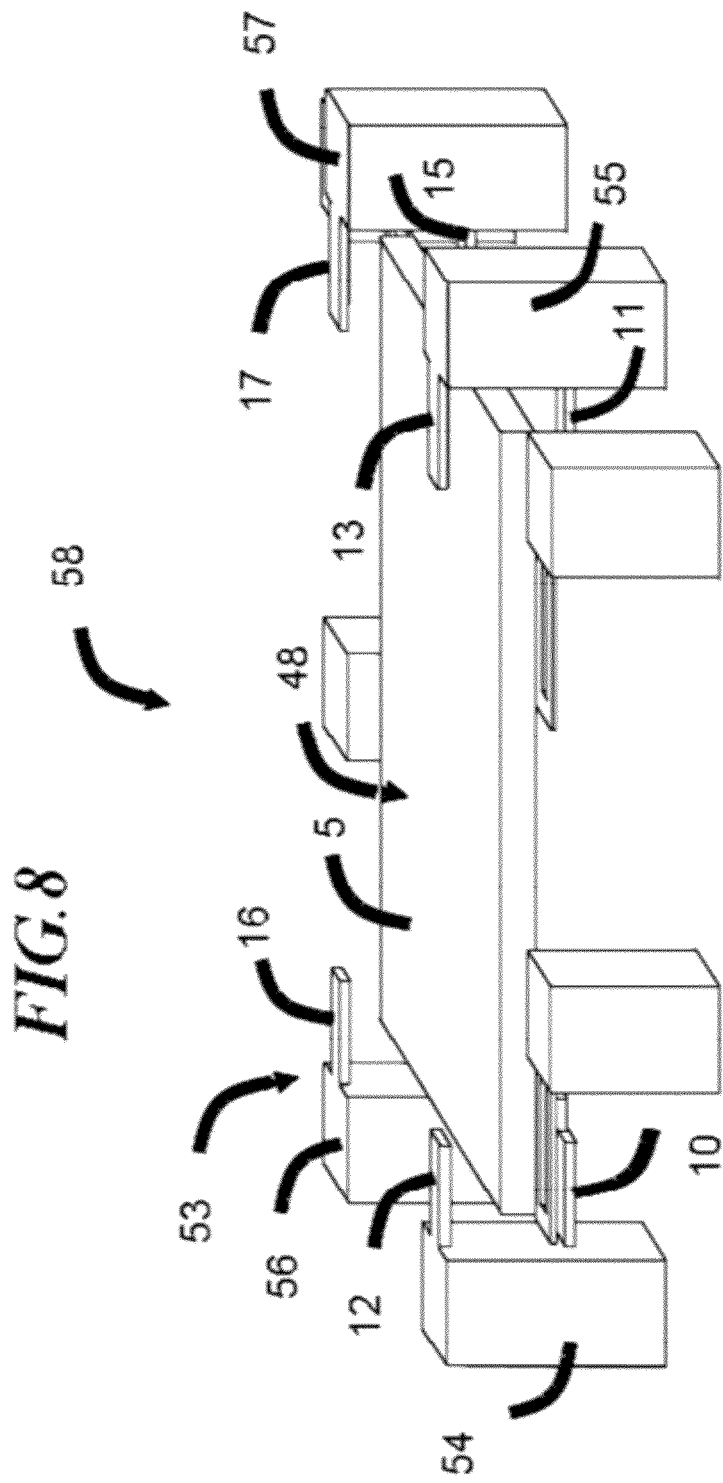

FIG. 4-14 illustrate steps to build up the micro-electromechanical device 1 of this invention. FIG. 4 illustrates the silicon semiconductor substrate 45 that the CMOS memory circuit may be formed in the inside. For example, a memory cell circuit may be formed by 6 transistor CMOS SRAM inside the substrate 45, after forming an address circuit using twin well CMOS, and DLM interconnect technologies, followed by a deposition of thick oxide film, and the thick oxide film is polished to flatten by chemical mechanical polishing (CMP) to form the base surface plane 46 on which a superstructure is to be built, the bias voltage and the address complementary output voltage from the CMOS memory cell are pulled out on the plane 46 through the connecting holes opened in the thick oxide film. FIG. 5 illustrates the structure 47 that the thin film metal electrode plate 2 is formed on the plane 46 on which multilevel thin film metal structure is to be built. The plate 2 may be designed with the size of, for example, 0.3 μm thickness and 80 square μm area, and the address complementary output voltage Va(−) 3a from the CMOS memory cell is connected to the plate 2. FIG. 6 illustrates the structure 48 that suspends the thin film metal electrode plate 5 horizontally in space. The thin film metal hinges 6, 7, 8, and 9 are equally arranged around the plate 5 at the same height level as the plate 5. For example, the plate 5 may be designed with the size of 0.4 μm thickness and 110 square μm area. The plate 5 can move up and down in response to electrostatic attraction with maintaining the level and good balance, as there are the thin film metal hinges 6, 7, 8, and 9 that bend upwards and downward and the end of each beam is equally connected to the plate 5 and the other end of each beam is connected to the support pillar 49, 50, 51, and 52, respectively, and the plate 5 is suspended in the space at the height of, for example, about 1.3 μm from the plane 46 by the hinges 6, 7, 8, and 9. The hinges 6, 7, 8, and 9 may be designed by using aluminum material, for example with the size of 0.15 μm thickness, 1 μm width, and 8 μm length. When the stress of 130 nN is applied to the end of one hinge, the amount of bending may be controlled to about 0.6 um. FIG. 7 illustrates the stop structure 53 that limits the working range that the plate 5 can move up and down. The thin film metal cantilever stopping plates 10 and 12 are connected to the support pillar 54, the thin film metal cantilever stopping plates 11 and 13 are connected to the support pillar 55, the thin film metal cantilever stopping plates 14 and 16 are connected to the support pillar 56, and the thin film metal cantilever stopping plates 15 and 17 are connected to the support pillar 57, similarly. FIG. 8 illustrates the structure 58 that the structure 53 is set up with aligned to the structure 48. The pillars 54, 55, 56, and 57 are arranged equally around the plate 5, the height that the plate 5 locates is set to the middle between the height that the plate 12, 13, 16, or 17 locates and the height that the plate 10, 11, 14, or 15 locates, the plates 10 and 12 are connected to the pillar 54, the plates 11 and 13 are connected to the pillar 55, the plates 14 and 16 are connected to the pillar 56, and the plates 15 and 17 are connected to the pillar 57, as well. The free ends of the cantilever stopping plates connected to each pillar may overlap slightly with the edge of the plate 5 above and below the plate 5, and the movable range of the plate 5 is restricted to upwards by, for example, about 0.5 μm and downward by, for example, about 0.5 μm respectively.

Figure 9:
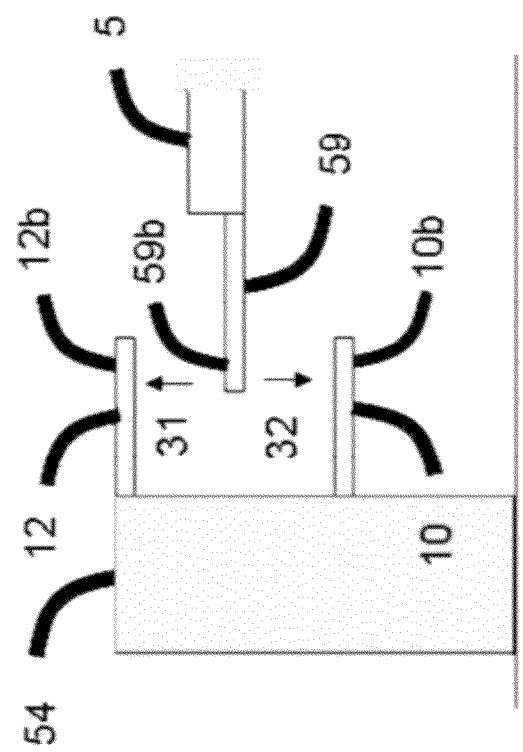

FIG. 9 illustrates the modification of the stop structure and configuration which restricts the working range to upper side and lower side of the plate 5. Connecting the thin film metal cantilever stopping plate 59 to the edge of the plate 5, and setting the plate 59 at the middle of the height position between the plates 10 and 12 that are connected to the pillar 54, the free end 59b of the plate 59 is arranged to overlap slightly with the free end 10b of the plates 10 below the plate 59 and the free end 12b of the plates 12 above the plate 59. When the plate 5 carries out transition movement in the space between the plates 10 and 12 and is stopped and held by either the plate 10 or 12, the plate 10 always receives the stress with the direction 32, and the plate 12 always receives the stress with the direction 31. As the plate 59 is stressed both from the directions 31 and the direction 32 by turns at every transition movement, it may be less chance for the plate 59 to have the memory phenomenon of memorizing the direction of stress.

Figure 10:
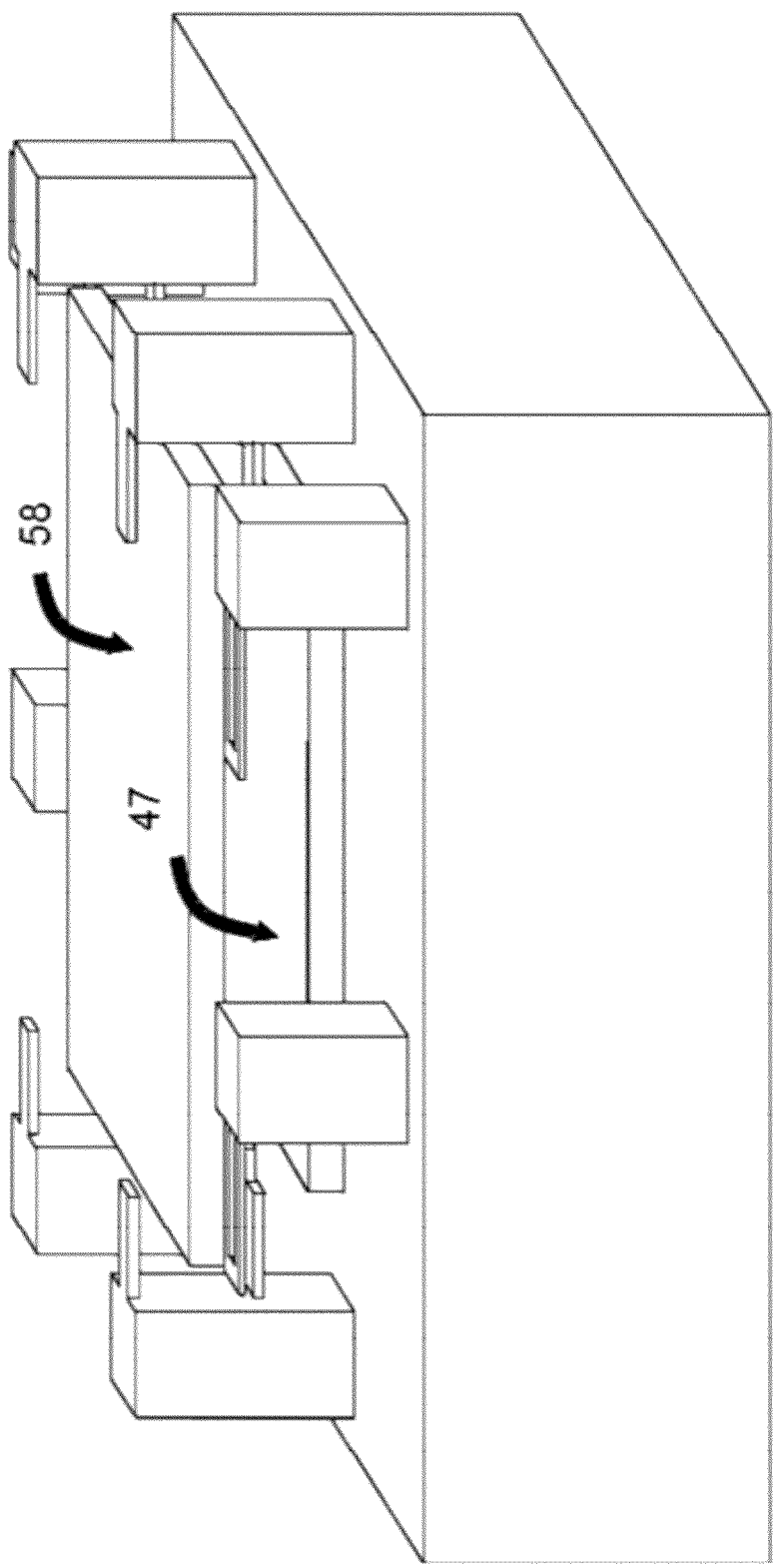
Figure 11:
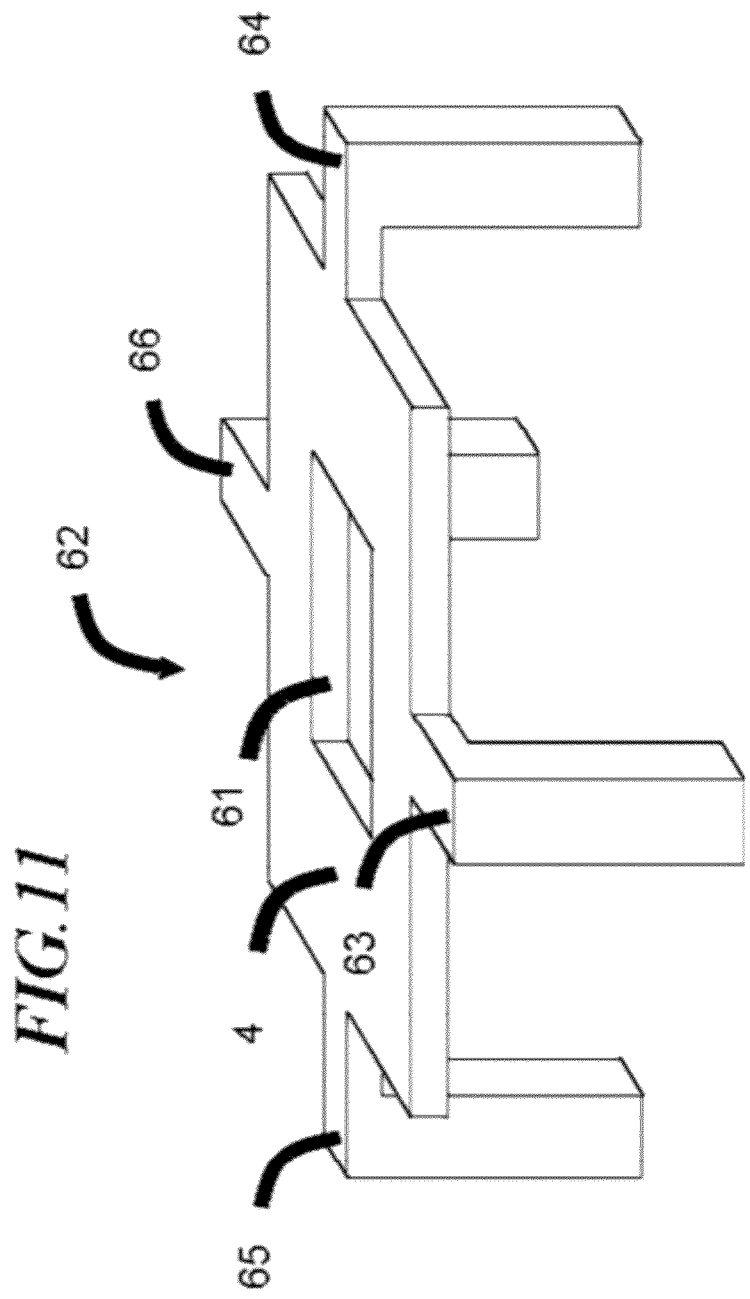
Figure 12:
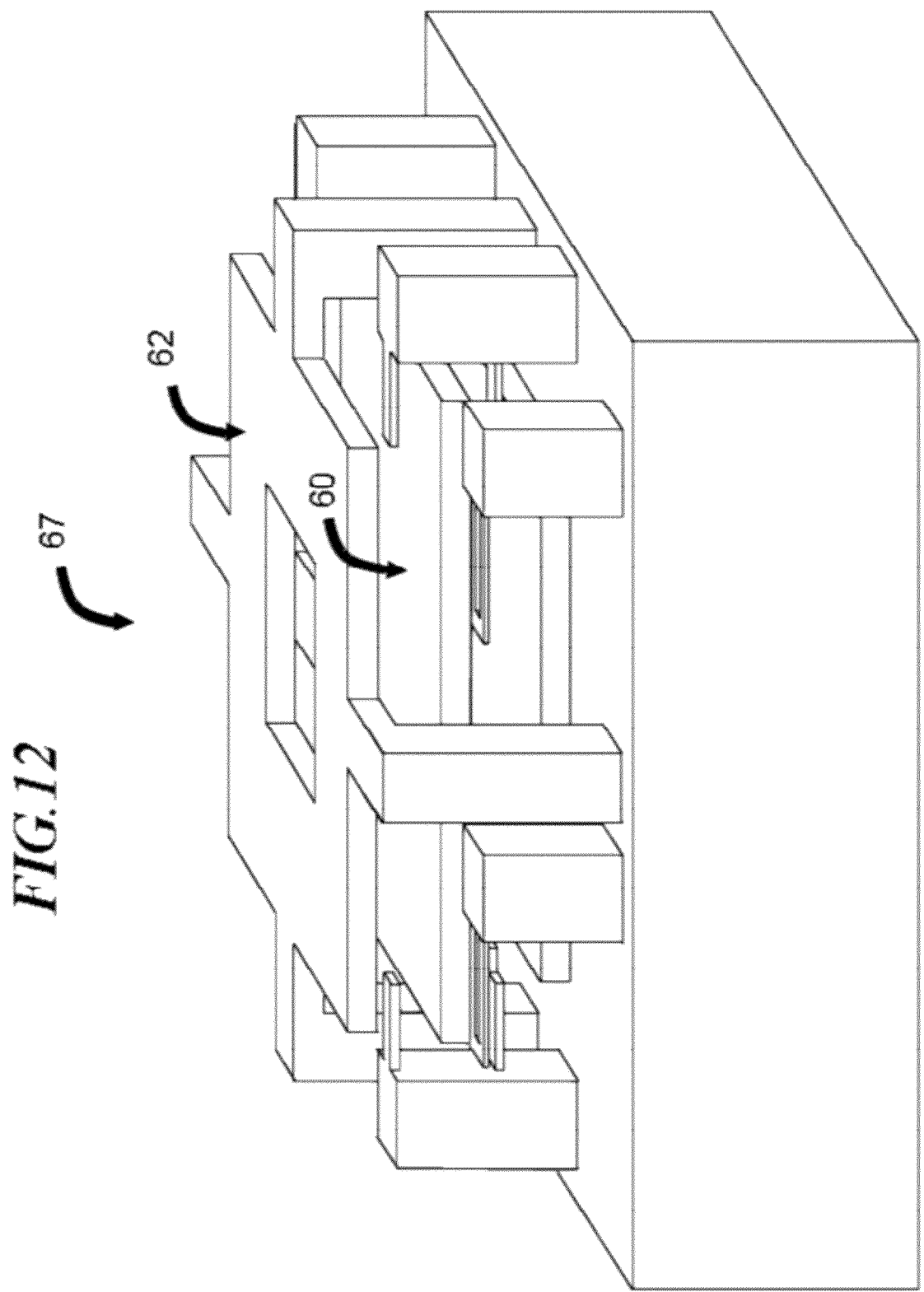
Figure 13:
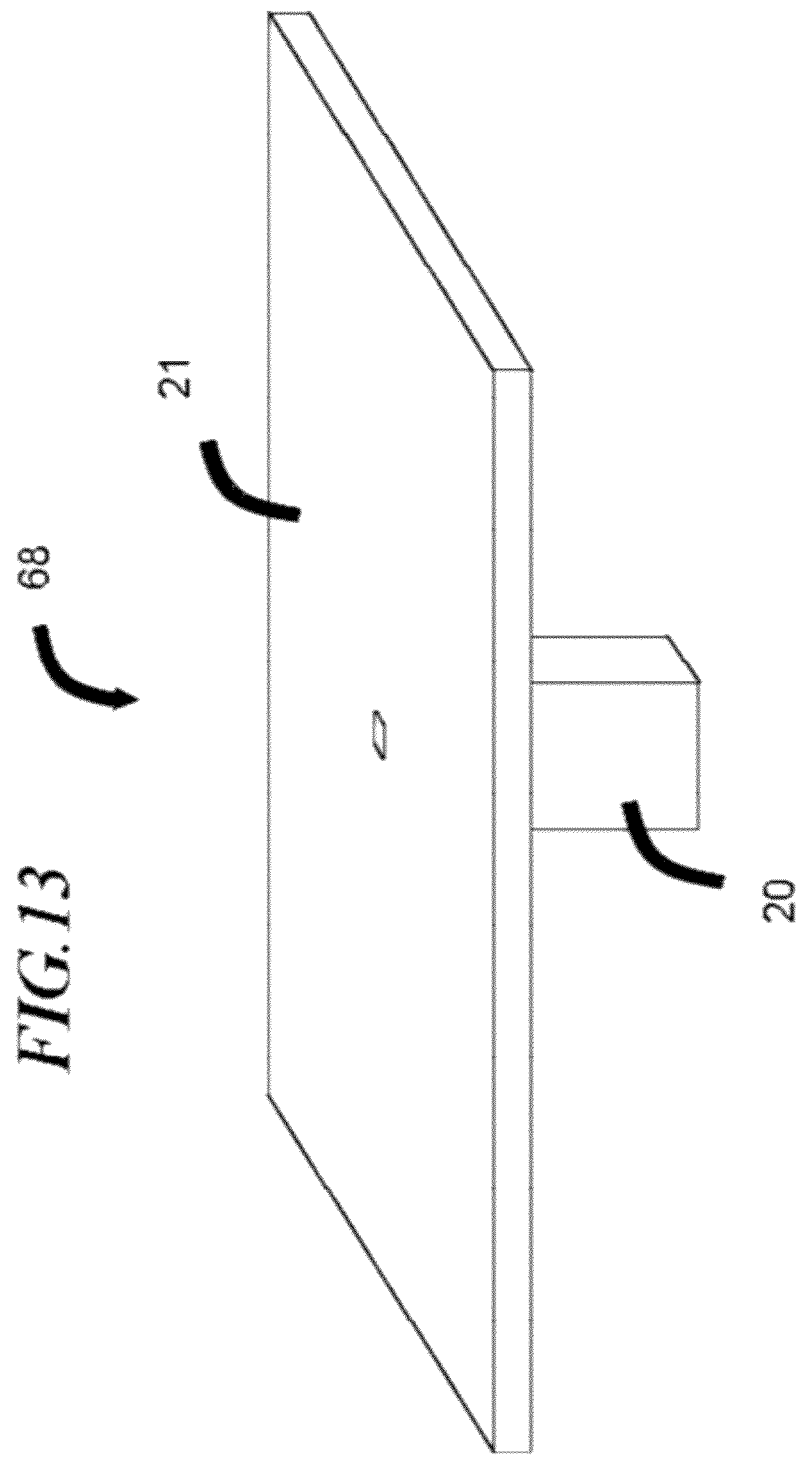
Figure 14:
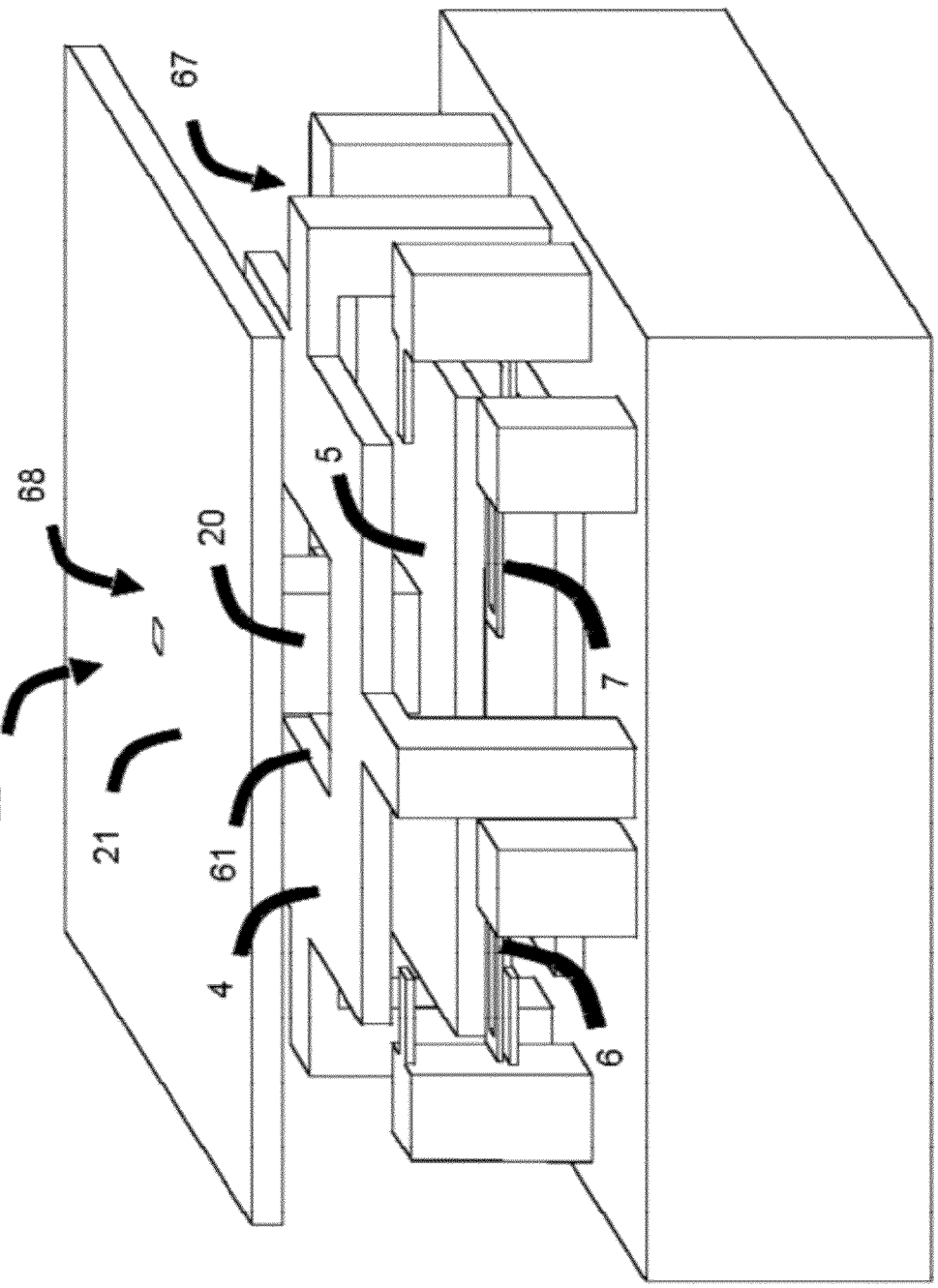

FIG. 10 illustrates the structure 60 that the structure 58 is set up with aligned to the structure 47. The plate 2 in the structure 47 is fully covered by the plate 5 in the structure 58. FIG. 11 illustrates the structure 62 which supports the thin film metal electrode plate 4 in the air. The aperture 61 is formed in the center of the plate 4, the plate 4 is supported by four support pillars 63, 64, 65, and 66, and the address complementary output voltage Va(+) 3b from a memory cell is supplied to the plate 4. The plate 4 that thickness is, for example, about 0.4 μm is arranged above the plate 5 separating by the same space distance as the space distance between the plate 2 and the plate 5, the effective electrode area of the plate 4 to the plate 5 may be designed to be about 80 square μm that is the same size as the effective area of the plate 2 to the plate 5. FIG. 12 illustrates the structure 67 that the structure 62 is set up with aligned to the structure 60. FIG. 13 illustrates the structure 68 which comprises the thin film metal electrode plate and light reflector 21 and the pillar 20, the pillar 20 is attached to the center of the back of the plate and light reflector 21. FIG. 14 illustrates the structure 69 completed with that the structure 68 is connected with aligned to the structure 67. The pillar 20 of the structure 68 passes through the aperture 61 not to touch to any edge of the aperture 61, and is connected to the center part of the plate 5. And then, the movable structure 22 that the plate and light reflector 21 and the plate 5 are connected by the pillar 20 is completed. The bias voltage Vb 23 is supplied to the structure 22 through the thin film metal electrode hinges 6, 7, 8, and 9, and also to the thin film metal cantilever stopping plates 10, 11, 12, 13, 14, 15, 16, and 17 of a structure 53. In the step of the bias voltage off in the drive sequence 35 or 43, when the plate 5 takes off from the free ends of the stopping plates 10, 11, 14, and 15, in order for the structure 22 to receive several nN of electrostatic attraction of the direction 31 that the structure 22 is pulled to the plate 4, the height of the pillar 20 may be designed to be, for example, about 4.5 μm. Then, the plate and light reflector 21 that may be designed with the size of about 0.4 μm thickness, 225 square μm area, is set up at the height of about 2.6 micrometers above the plate 4 by the 4.5 μm-high pillar 20. The structure of the micro-electromechanical device 1 of this invention is constructed in the space on a base surface plane 46 in order of the structure 47, the structure 48, the structure 53, the structure 58, the structure 60, the structure 62, the structure 67, the structure 68, the structure 69, however, in an actual manufacturing process, after decomposing each functional structure into the structural elements according to the height position, using the sacrifice layer by organic polymer, forming and accumulating the elements on the plane 46 from the lower layer to the higher layer in order, and after when completing the structure 69, the spatial structure is released at once to the space at the process of removing the sacrifice layer by using isotropic plasma etching technology.

Figure 15:
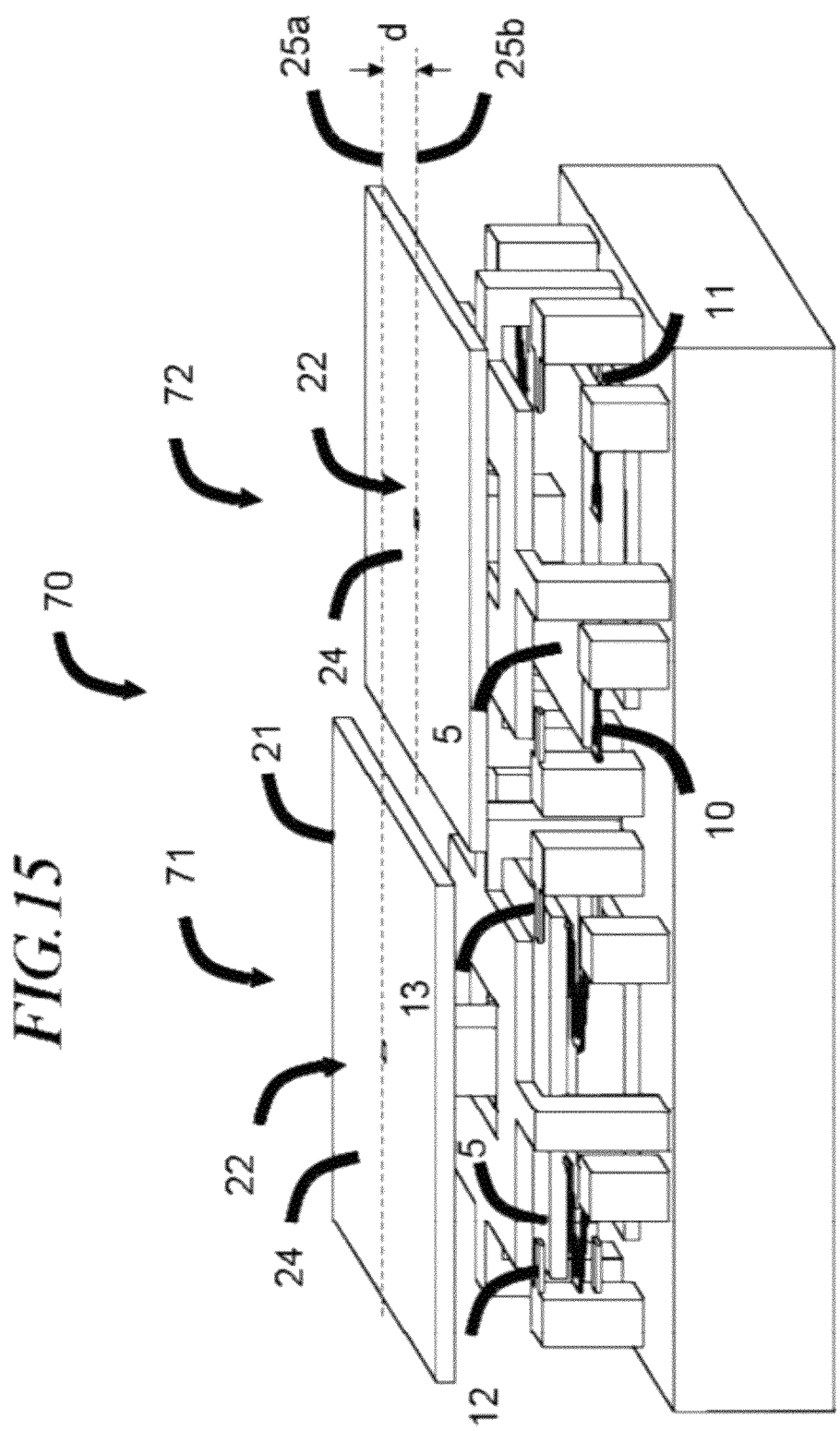
FIG. 15 illustrates the invented micro-electromechanical device driven to the two kinds of stable states.

FIG. 15 illustrates the micro-electromechanical device 70 driven to two kinds of stable states. For the micro-electromechanical device 71 in that the plate and light reflector 21 is in the stable state at the upper position, the plate 5 of the structure 22 is held by and stabilized on the plates 12, 13, 16, and 17, accordingly the surface 24 of the plate and light reflector 21 is stood still and stabilized at the position 25a, on the other hand, for the micro-electromechanical device 72 in that the plate and light reflector 21 is in the stable state at the lower position, the plate 5 of the structure 22 is held by and stabilized on the plates 10, 11, 14, and 15, accordingly the surface 24 of the plate and light reflector 21 is stood still and stabilized at the position 25b. As the cantilever stopping plate is bent slightly by the stress transmitted from the plate 5 and its amount of the bending may be also slightly influenced by flipping the data of a memory cell, therefore the change in height due to the bending is also reflected on the distance d between the height positions 25a and 25b. Thus, the optical path length and the accuracy of the optical path length of the light reflected from the surface 24 of the plate and light reflector 21 are influenced fourfold by the amount of bending of the cantilever stopping plate. For example, for the demand of switching the optical path length of 532 nm wavelength light with ⅛ wavelength precision, with applying 25 V of the voltage Vb 23 to the structure 22, 5 V of the voltage Va(−) 3a to the plate 2, and 0 V of the voltage Va(+) 3b to the plate 4, the plate 5 of the structure 22 is in the state of hold and stabilization at the height position of the plates 12, 13, 16 and 17, when the data of a memory cell is flipped, the stress decrease caused by the flipping the data is transmitted and distributed from the plate 5 to the four plates 12, 13, 16, and 17, and each cantilever stopping plate will receive the stress decrease of about 100 nN. And in order to control the amount of bending per one cantilever stopping plate to about 17 nm that is equivalent to 1/32 wavelength of the 532 μm light, the cantilever stopping plate may be designed, for example, by using aluminum material with the size of 300 nm thickness, 1 μm width, and 4 μm length.

Figure 16:
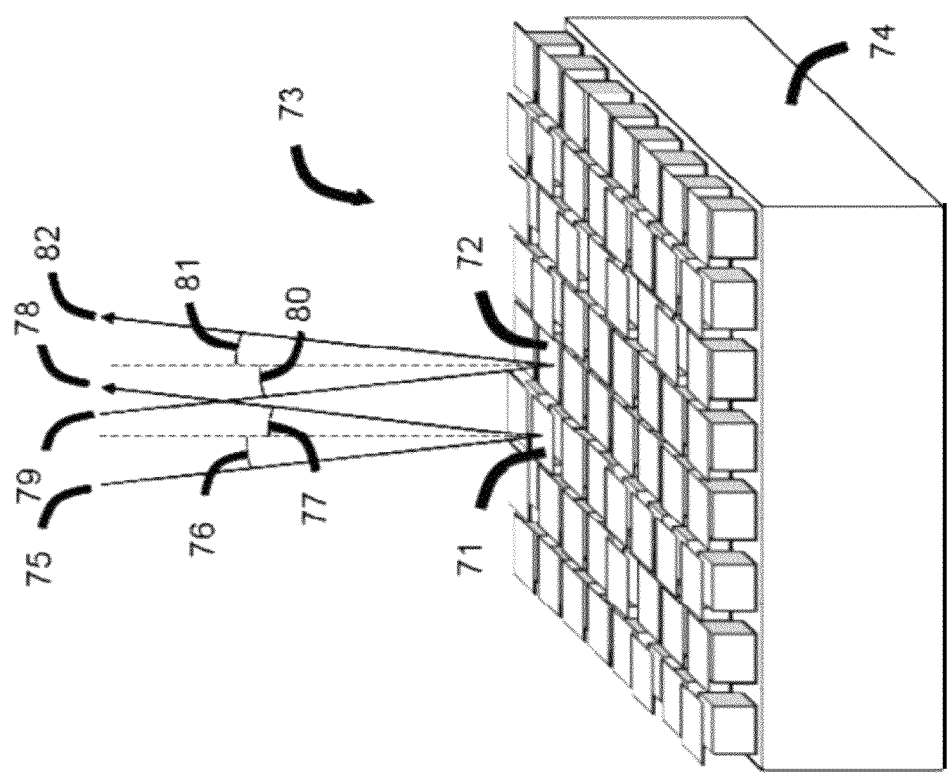
FIG. 16 illustrates an example of array arrangement that consists of many pieces of the micro-electromechanical device of the invention.

FIG. 16 illustrates an example of the array arrangement 73 that consists of many pieces of the micro-electromechanical device 1 of this invention. On the CMOS circuit silicon semiconductor substrate 74, the array arrangement of 64 pieces of the structure 69 is carried out, the plate and light reflector 21 is positioned at either the upper position or the lower position in actively operating state. The incident light 75 in phase from light source enters at the angle 76 into the micro-electromechanical device 71 in that the plate and light reflector 21 is in the stable state at the upper position, and is reflected at the angle 77 on the surface 24 of the plate and light reflector 21 and turns into the reflected light 78, similarly, the incident light 79 that advances in phase and parallel with the incident light 75 enters at the angle 80 into the micro-electromechanical device 72 in that the plate and light reflector 21 is in the stable state at the lower position, and is reflected at the angle 81 on the surface 24 of the plate and light reflector 21, and turns into the reflected light 82. In this way, the optical path length difference is produced between the light 78 and the light 82, enabling the switching modulation of the optical path length. The light plane reflected from whole surface area of the array composed of 64 pieces of light reflectors can be modulated in 8×8 resolutions by the optical path length.

What is claimed is:
1. A micro-electromechanical device, said device comprising:

a substrate;

a 1$^{st}$ layer level metal plate supported on said substrate;

a 5$^{th}$ layer level metal plate, supported by a first set of two or more metal support pillars laid out around said 5$^{th}$ layer level metal plate on said substrate;

a 3$^{rd}$ layer level metal plate, said 3$^{rd}$ layer level metal plate being attached to two or more bendable metal elements mounted on a second set of metal support pillars laid out around said 3$^{rd}$ layer level metal plate;

two or more 2$^{nd}$ layer level metal stopping plates laid out around said 3$^{rd}$ layer level metal plate with making free ends of said 2$^{nd}$ layer level metal stopping plates overlap slightly to the bottom surface of an edge of said 3$^{rd}$ layer level metal plate below said 3$^{rd}$ layer level metal plate and above said 1$^{st}$ layer level metal plate, while two or more opposite ends to the free ends of said 2$^{nd}$ layer level metal stopping plates are connected to corresponding two or more of a third set of metal support pillars;

two or more 4$^{th}$ layer level metal stopping plates laid out around said 3$^{rd}$ layer level metal plate with making free ends of said 4$^{th}$ layer level metal stopping plates overlap slightly to the upper surface of the edge of said 3$^{rd}$ layer level metal plate above said 3$^{rd}$ layer level metal plate and below said 5th layer level metal plate, while two or more opposite ends to the free ends of said 4$^{th}$ layer level metal stopping plates are connected to said corresponding two or more of said third set of metal support pillars;

a 6$^{th}$ layer level metal plate supported by a metal support pillar built on said 3$^{rd}$ layer level metal plate not to make any contact with said 5$^{th}$ layer level metal plate;

a gap among said 1$^{st}$ layer level metal plate, said 5$^{th}$ layer level metal plate, two or more said 2$^{nd}$ layer level metal stopping plates, two or more said 4$^{th}$ layer metal level stopping plates, two or more said bendable metal elements at 3$^{rd}$ layer level, said 3$^{rd}$ layer level metal plate, said 6$^{th}$ layer level metal plate, and said metal support pillar built on said 3$^{rd}$ layer level metal plate, allowing operability for bending two or more said bendable metal elements at said 3$^{rd}$ layer level, position—movement of said 3$^{rd}$ layer level metal plate together with said metal support pillar built on said 3$^{rd}$ layer level metal plate and said 6$^{th}$ layer level metal plate, and stopping of position—movement of said 3$^{rd}$ layer level metal plate by either said 2$^{nd}$ layer level metal stopping plates or said 4$^{th}$ layer level metal stopping plates; and a position-movable rigid metal member comprising said 3$^{rd}$ layer level metal plate, said 6$^{th}$ layer level metal plate, said metal support pillar built on said 3$^{rd}$ layer level metal plate, and two or more said bendable metal elements fixed to corresponding two or more of said second set of metal support pillars on said substrate; and an electrical connection of a bias voltage to said position-movable rigid metal member and two or more said 2$^{nd}$ layer metal stopping plates and two or more said 4$^{th}$ layer metal stopping plates, the electrical connection of a complementary output voltage to said 1$^{st}$ layer metal plate, and the electrical connection of a complementary output-bar voltage to said 5$^{th}$ layer level metal plate, wherein the voltage differential among said 1$^{st}$ layer plate, said 5$^{th}$ layer plate, and said position-movable rigid metal member is operable to create electrostatic attraction with said 1$^{st}$ layer level metal plate and said 5$^{th}$ layer level metal plate to cause said 3$^{rd}$ layer level metal plate in said position-movable rigid metal member to move toward either said 1$^{st}$ layer level metal plate or said 5$^{th}$ layer level metal plate and to stop and settle on either two or more said 2$^{nd}$ layer level metal stopping plates or two or more said 4$^{th}$ layer level metal stopping plates, allowing said position-movable rigid metal member to take at least two states in positioning.

2. The device set forth in claim 1, wherein said substrate includes discrete area for providing signals for controlling said position movement of said position-movable rigid metal member.

3. The device set forth in claim 2, wherein said substrate contains an address circuitry for issuing said complementary output voltage.

4. The device set forth in claim 3, wherein said substrate further contains a circuitry for issuing said bias voltage.

5. The device set forth in claim 1, wherein said gap is an air gap.

6. The device set forth in claim 1, wherein said bendable metal elements are hinges.

7. The device set forth in claim 1, wherein said 2$^{nd}$ layer level metal stopping plates are 2$^{nd}$ layer level metal cantilever stopping beams and 4$^{th}$ layer metal stopping plates are 4$^{th}$ layer level metal cantilever stopping beams.

8. The device set forth in claim 7, wherein a stress-strain characteristic of said 2$^{nd}$ layer level metal cantilever stopping beams and said 4$^{th}$ layer level metal cantilever stopping beams contributes to the degree of precision in positioning of said 6$^{th}$ layer level metal plate in said position-movable rigid metal member.

9. The device set forth in claim 8, wherein the distance between the position in height that said 3$^{rd}$ layer level metal plate is stopped and settled on upper surfaces of the free ends of said 2$^{nd}$ layer level metal cantilever stopping beams and the position in height that said 3$^{rd}$ layer level metal plate is stopped and settled on bottom surfaces of free ends of said 4$^{th}$ layer level metal cantilever stopping beams is fine-tuned by the bias voltage from a bias voltage circuitry.

10. The device set forth in claim 1, wherein, said 3$^{rd}$ layer level metal plate levels in the middle height between the height of bottom surface of 5$^{th}$ layer level metal plate and the height of upper surface of 1$^{st}$ layer level metal plate, when said bias voltage, said complementary output voltage, and said complementary output-bar voltage are turned off.

11. The device set forth in claim 1, wherein the middle height between the height of bottom surface of said 5$^{th}$ layer level metal plate and the height of upper surface of said 1$^{st}$ layer level metal plate is equivalent to the middle height between the height of bottom surface of said 4$^{th}$ layer level metal plate and the height of upper surface of said 2$^{nd}$ layer level metal plate.

12. The device set forth in claim 1, wherein the height of said metal support pillar connecting said 3$^{rd}$ layer level metal plate and said 6$^{th}$ layer level metal plate is set up more than the sum total value of the thickness of said 5$^{th}$ layer level metal plate and the twice of the distance between the position in height of the bottom surface of said 5$^{th}$ layer level metal plate and the position in height of the upper surface of said 2$^{nd}$ layer level metal plate.

13. The device set forth in claim 1, wherein said metal support pillar connecting said 3$^{rd}$ layer level metal plate and said 6$^{th}$ layer level metal plate passes through an aperture formed in the middle of said 5$^{th}$ layer level metal plate not to make contact with any edge of said aperture in said 5$^{th}$ layer level metal plate.

14. The device set forth in claim 1, wherein said 6$^{th}$ layer level metal plate is light reflector.

15. The device set forth in claim 14, wherein said 6$^{th}$ layer level metal plate hides underlying structure.

16. An array that consists of many devices, each being of the type of the device set forth in claim 1, said 6$^{th}$ layer level metal plate in said device individually allowing to take at least two states of upper positioning and lower positioning in height, said array comprising a base structure for supporting all of said $6^{th}$ layer level metal plates of said many devices, said array being maintained in a plane separate from the plane of said base structure;

a surface area formed of many plates of said $6^{th}$ layer level metal plate of said device, wherein the optical path length of the light plane reflected from said surface area is modulated with resolution.

* * * * *